United States Patent [19]

Paranjpe et al.

[11] Patent Number: 4,510,503

[45] Date of Patent: Apr. 9, 1985

[54] INK JET PRINTER CONTROL CIRCUIT AND METHOD

[75] Inventors: Suresh C. Paranjpe, Dallas; Robert B. McJohnson, Pilot Point, both of Tex.

[73] Assignee: The Mead Corporation, Dayton, Ohio

[21] Appl. No.: 392,195

[22] Filed: Jun. 25, 1982

[51] Int. Cl.[3] .......... G01D 15/18

[52] U.S. Cl. .......... 346/75; 346/1.1

[58] Field of Search .......... 346/75, 140 R, 1.1; 400/625

[56] References Cited

U.S. PATENT DOCUMENTS

| | | | |
|---|---|---|---|
| 3,588,906 | 6/1971 | Van Brimer et al. | 346/1.1 |
| 3,596,275 | 7/1971 | Sweet | 346/1.1 |
| 3,701,998 | 10/1972 | Mathis | 346/75 |
| 4,012,745 | 3/1977 | Brown et al. | 346/1.1 |
| 4,047,085 | 9/1977 | Ollendick | 400/126 X |
| 4,326,204 | 4/1982 | Erin | 346/75 |
| 4,371,875 | 2/1983 | Jinnai | 346/75 |
| 4,413,265 | 11/1983 | Kockler et al. | 346/75 X |

*Primary Examiner*—E. A. Goldberg

*Assistant Examiner*—Gerald E. Preston

*Attorney, Agent, or Firm*—Biebel, French & Nauman

[57] ABSTRACT

An ink jet printer control circuit is disclosed in which provision is made for production of drop clock signal pulses for application to the electromechanical drop stimulation transducer of the printer. Print enable pulses are provided by a state controller means to the charge electrode driver of the printer so as to permit selective charging of drops produced by the jet drop stream. An edge detector means is responsive to the leading edge of each pulse in the drop clock signal pulse train to provide an edge detection pulse. Additionally, an encoder arrangement provides a train of synchronization pulses, each such pulse signifying an increment of movement of the print receiving medium. The state controller responds to the edge detection pulses and to the synchronization pulses and provides a print enable pulse upon receipt of an edge detection pulse next following receipt of a synchronization pulse. The state controller means includes three flip-flops which are sequentially actuated so that a print enable pulse is provided only after receipt of at least two edge detection pulses prior to each synchronization pulse.

19 Claims, 4 Drawing Figures

INK JET PRINTER CONTROL CIRCUIT AND METHOD

BACKGROUND OF THE INVENTION

The present invention relates to ink jet printers and, more particularly, to a circuit and method of operation for use in such a printer which provides for optimum charging of drops and drop placement in dependence upon movement of a print receiving medium.

Ink jet printers, such as shown in U.S. Pat. No. 3,701,998, issued Oct. 31, 1972, to Mathis, and assigned to the assignee of the present invention, are known in which one or more jet drop streams of electrically conductive ink are produced by forcing the ink under pressure through an orifice or nozzle of a print head. The ink flows through the nozzle and emerges as a fluid filament which, in the absence of mechanical stimulation, would break up into drops of varying size and spacing.

It is known, however, that if mechanical stimulation is applied to either the ink, the nozzle, or the print head, as by a piezoelectric or other electromechanical transducer, the fluid filament may be caused to break up into drops of substantially uniform size and spacing. Further, if a charge electrode is placed in the vicinity of the fluid filament tip, from which the drops are formed, and a charge voltage applied to the electrode, an induced charge in the filament tip is carried away as each successive drop is formed.

By selective application of the charge voltage to the electrode, various ones of the drops produced by the jet drop stream may be charged to one or more levels, while others of the drops are left uncharged. The drops thereafter pass through an electrostatic field which deflects the charged drops in dependence upon the electrical charge which they carry. The drops are thus separated into at least two trajectories, with the uncharged drops passing unaffected through the field. The drops in one of the trajectories are deposited upon a moving print receiving medium at a print station, while the drops in the other trajectory or trajectories are caught by a drop catcher to prevent their deposit on the print receiving medium. If the drops are charged to more than two levels, they will be selectively deflected into more than two trajectories. This permits the drops from a single jet drop stream to be deposited at more than one position. A number of jet drop streams may be provided. In the printer using a single jet drop stream, the print head transport or the transport for the print receiving medium or both are arranged such that drops from the jet may be deposited at a large number of points across the medium. In either type of printer by selective charging and catching of the drops, a number of drops may be deposited upon the print receiving medium in a manner so as to form collectively a print image.

It will be appreciated that the quality of the print image will be dependent upon a number of different factors. If the timing of the application of charge signals to the charge electrode is not synchronized with the timing of drop formation, it will be appreciated that when a drop is formed while the charge electrode potential is being switched from one charge voltage to another, the drop will be improperly charged and, as a consequence, will not undergo the desired deflection, resulting in misplacement. Further, it will be appreciated that any fluctuations in the velocity of the print receiving medium past the print station will result in drops striking the medium at points other than desired.

Finally, it will be appreciated that as a drop is being formed from the fluid filament, the charge induced on the drop will be dependent in part upon the charges carried by previously formed drops in the jet drop stream, since these previously formed drops are still relatively close to the fluid filament tip. This effect, known as drop-to-drop "cross talk", produces inaccurate charging of drops, causing inaccurate deflection of the drops in the deflection field.

A number of approaches have been taken to eliminate or compensate for such drop charging and placement problems. In U.S. Pat. No. 3,588,906, issued June 28, 1971, to Van Brimer et al, an ink jet printer is disclosed in which a tachometer arrangement provides pulses at a frequency corresponding to the rate of movement of the print receiving medium past the print station. These pulses are utilized to control the timing of the application of charging signals to the charge electrode, as well as to control the frequency of the piezoelectric transducer which provides drop stimulation. While providing precise control of drop charging and stimulation in correspondence with movement of the print receiving medium, such an arrangement results in the application to the piezlelectric stimulator of a driving signal which fluctuates in frequency in dependence upon the fluctuation in the speed of the print receiving medium.

It should be appreciated, however, that the amplitude response of the piezoelectric transducer is not independent of the stimulation frequency. As a consequence, a fluctuation in stimulation amplitude and a corresponding fluctuation in fluid filament length may result from varying the transducer driving frequency during operation of the printer. If the fluid filament changes in length, the point of drop formation from the fluid filament tip is altered, thus changing the distance between the charge electrode and the drops being formed and, consequently, the charging efficiency of the electrode. Further, the difficulties encountered with drop-to-drop cross talk are not compensated by the Van Brimer et al system.

In U.S. Pat. No. 4,012,745, issued Mar. 15, 1977, to Brown et al, an ink jet printer is disclosed in which the piezoelectric stimulator is driven at a constant frequency, while the timing of the application of successive charging potentials to the charge electrode is controlled by a phase correction system which monitors the timing of drop formation by means of a microphone that sits just inside the mouth of the ink droplet catcher. While synchronizing the application of charging signals to the charge electrode in dependence upon the timing of drop formation, and while providing a constant frequency driving signal to the piezoelectric transducer, the Brown et al system does not provide for compensation for drop-to-drop cross talk, nor for compensation for fluctuations in the velocity of the print receiving medium.

U.S. Pat. No. 3,596,275, issued July 27, 1971, to Sweet, teaches a variable level charging system for an ink jet signal recording system in which printing is accomplished with only every third drop of a jet drop stream. The intermediate pairs of drops, termed "guard drops", are uniformly charged such that they are deflected to the catcher. By this arrangement, drop-to-drop cross talk is substantially reduced during charging of each of the print drops since the charging effects of the preceding two guard drops will always be the same and, therefore, may be taken into account.

It is seen, therefore, that there is a need for a system in which the above noted difficulties of the prior art are reduced so as to enhance the quality of the print image produced by an ink jet printer.

SUMMARY OF THE INVENTION

In an ink jet printer having an electromechanical transducer for mechanical stimulation of jet drop stream break up and at least one charge electrode driver which, when enabled, provides charging signals to at least one charge electrode for selectively charging drops in a jet drop stream, said printer including a transport for moving a print receiving medium past a print station, a circuit provides print enable signal pulses to the charge electrode driver and a drop clock signal pulse train to the electromechanical transducer. The circuit includes an oscillator means for producing a drop clock signal pulse train for application to the electromechanical transducer, and edge detector means, responsive to the drop clock signal pulse train, for providing an edge detection pulse at the leading edge of each pulse in the drop clock signal pulse train. The circuit further includes means for providing a synchronization signal in dependence upon the speed at which a print receiving medium is transported past the print station. The synchronization signal consists of a train of synchronization pulses, each such pulse signifying an increment of movement of the medium. Finally, the circuit includes state controller means, responsive to edge detection pulses and to the synchronization signal, for providing a print enable pulse upon receipt of an edge detection pulse next following receipt of each synchronization pulse.

The oscillator means comprises an oscillator providing a substantially constant frequency output, and a frequency divider, responsive to the oscillator output, for reducing the frequency of the oscillator output to provide the drop clock signal pulse train.

The state controller provides a print enable pulse only after receipt of at least two edge detection pulses prior to each synchronization pulse, whereby the frequency of the print enable signal pulse train is no more than one-third of the frequency of the drop clock signal pulse train, such that at least two guard drops may be provided between successive print drops produced by the ink jet printer. The edge detector means may be responsive to the substantially constant frequency pulse output such that the duration of each edge detection pulse is equal to the period of the substantially constant frequency pulse output. The state controller logic may include three bistable means, and logic means for sequentially actuating the three bistable means in response to the synchronization signal and the edge detection pulses, with one of the three bistable means providing the print enable pulses.

The logic means may include latch means, responsive to the synchronization signal, for providing a logic output in response to a synchronization pulse. The logic means may further comprise gate means, responsive to the latch means and to the edge detector means, for sequentially actuating the three bistable means upon receipt of the synchronization pulses, while additionally requiring a logic output from the latch means before actuation of the one of the three bistable means which provides the print enable pulses.

The circuit may further include means for sensing the presence of a print receipt medium at the print station. The logic means may be responsive to the means for sensing the presence of a print receiving medium at the print station such that a print enable pulse is provided only when the medium is present at the print station.

The method of operation of the ink jet printing system comprises the steps of:

(a) generating synchronization pulses in response to movement of the print receiving medium past the print station;

(b) generating a drop clock pulse train;

(c) applying the drop clock pulse train to the transducer;

(d) generating an edge detection pulse at the leading edge of each pulse in the drop clock pulse train; and (e) generating a print enable pulse upon the occurrence of an edge detection pulse next following the occurrence of a synchronization pulse.

The step of generating a print enable pulse may including the step of providing a print enable pulse only after the occurrence of at least two edge detection pulses prior to the synchronization pulse, whereby at least two guard drops are interposed between print drops in the jet drop stream. The drop clock pulse train may be substantially constant in frequency.

Accordingly, it is an object of the present invention to provide an ink jet printer, and a method of operation of such a printer, in which drop charging errors are reduced by applying a driving signal to an electromechanical transducer at a substantially constant frequency and applying charging signals to a charge electrode in synchronization with the driving signal after each increment of movement of a print receiving medium; to provide such a printer and method in which synchronization pulses are produced in dependence upon the speed at which the print receiving medium is transported past a print station; to provide such a printer and method in which a print enable pulse, permitting the application of charge signal to the charge electrode, is provided in synchronization with the driving signal, but only after receipt of a synchronization pulse; to provide such a printer and method in which two guard drops are provided between successive print drops; and to provide such a printer and method in which a print enable pulse is not provided unless a print receiving medium is present at the print station.

Other objects and advantages of the invention will be apparent from the following description, the accompanying drawings and the appended claims.

BRIEF DESCRIPTION OF THE DRAWINGS

FIGS. *2a* and *2b*, when assembled with FIG. *2a* above FIG. *2b*, provide a schematic diagram of the circuit of the present invention.

DETAILED DESCRIPTION OF THE PREFERRED EMBODIMENTS

Figure 1:
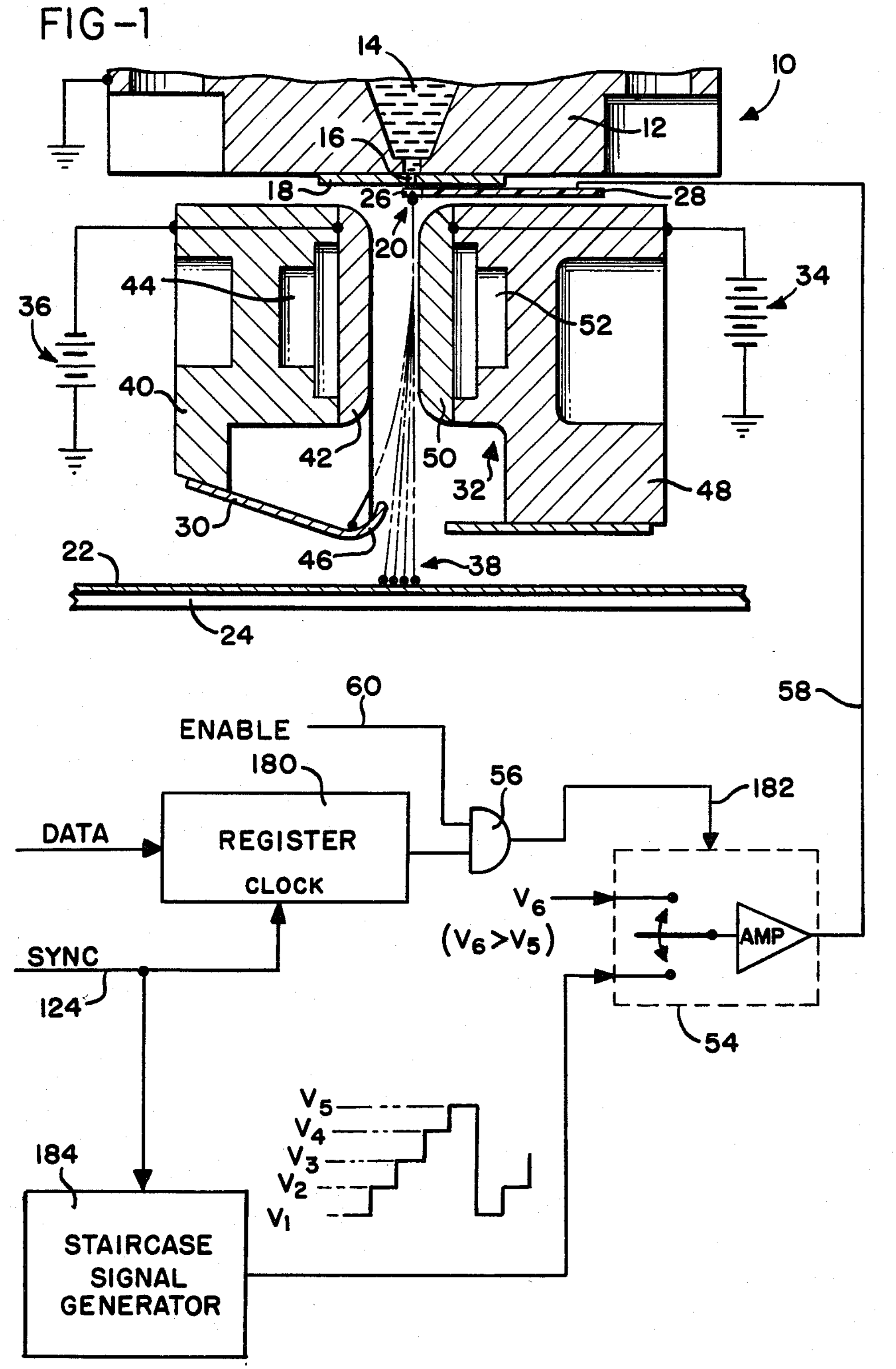
FIG. 1 is a sectional view taken through an ink jet printer, and includes an electrical schematic diagram showing a portion of the charge control circuitry.
Figure 2A:
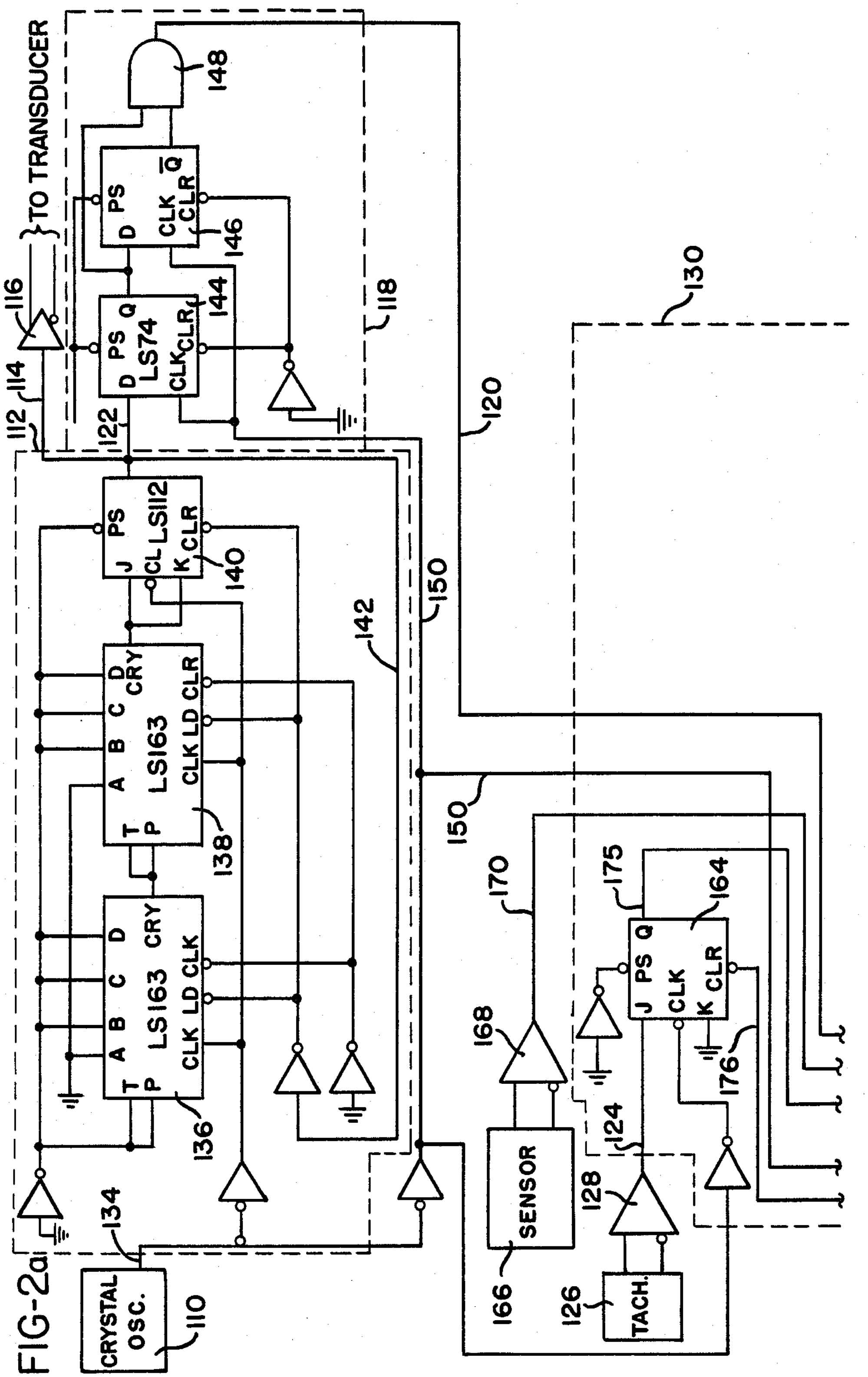
Figure 2B:
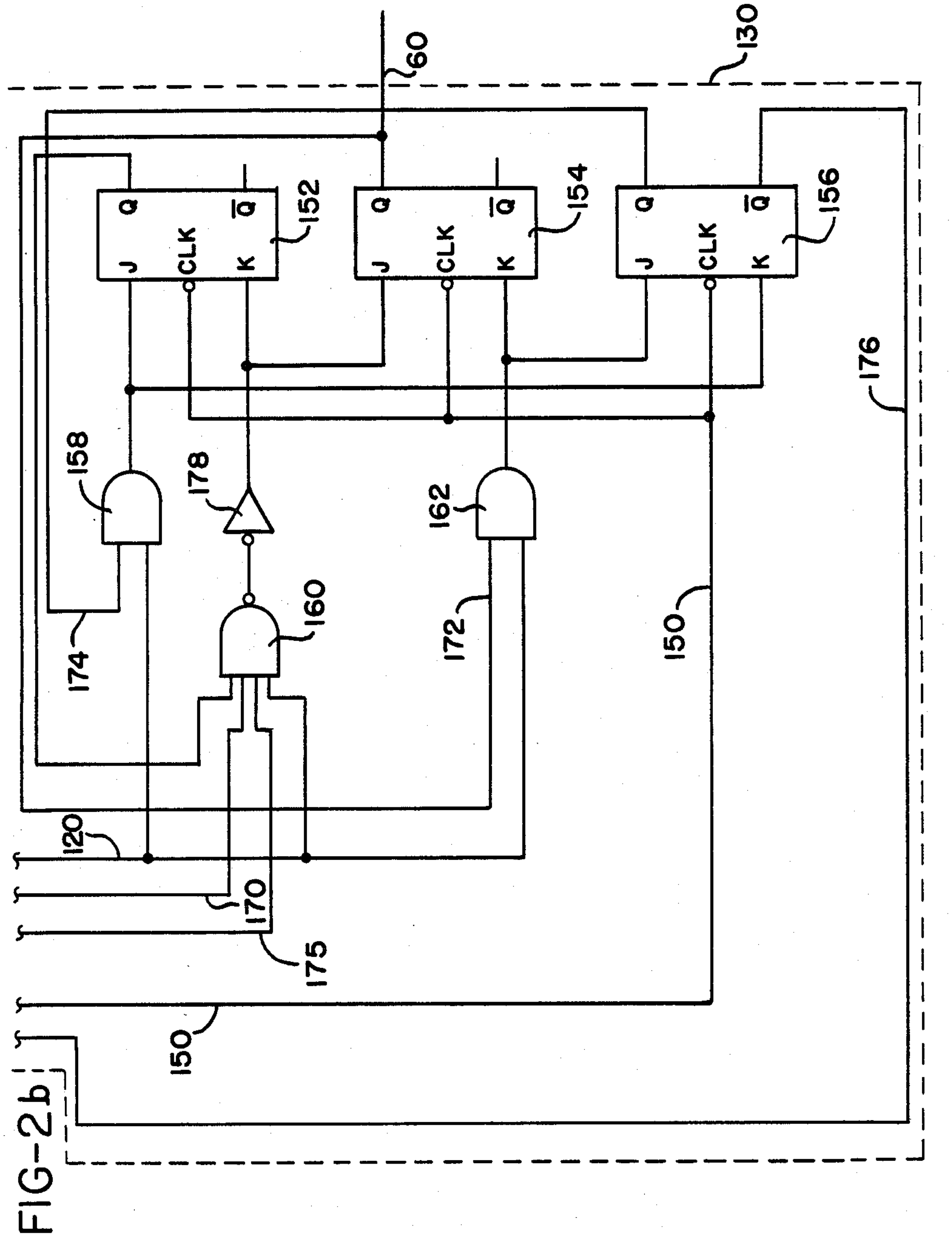

FIG. 1 illustrates an ink jet printer of the type which may incorporate the present invention. The printer has a print head 10 which includes a manifold 12 defining a reservoir 14 to which ink is applied under pressure. The ink emerges from orifices 16 defined in orifice plate 18 and breaks up into jet drop streams 20 which are initially directed toward a print receiving medium 22, carried by belt transport 24 past the print head. The print head 10 includes an electromechanical transducer (not shown) which stimulates the drop formation of the jet drop streams.

For example, a piezoelectric transducer may be positioned in the top of reservoir 14 to produce pressure waves which pass downward through the ink and are coupled to each of the jet drop streams. Alternatively, the transducer may be arranged to vibrate the entire print head.

Charge electrodes 26 associated with each of the streams are appropriately positioned adjacent the point of drop formation for selectively charging of the drops as they are formed. The charge electrodes may advantageously be defined by notches along the edge of charge plate 28 which are lined with electrical conductive material and electrically connected to individual printed circuit conductors on the top of plate 28. A drop catcher 30 is provided for catching the selected ones of the drops which are not to be deposited upon moving print receiving medium 22 as the medium moves beneath the printer.

A deflection means, including electrode 32, catcher 30, and voltage sources 34 and 36, produces an electrostatic field through which the drops pass. This field deflects the drops in dependence upon the electrical charges which they carry such that the drops are directed either to the catcher 30 or into one of the print trajectories 38.

The catcher 30 includes a body 40 which in conjunction with porous plate 42 defines a suction cavity 44. Any drops which strike plate 42 are ingested into cavity 44 and carried away. Similarly, deflected drops which are caught by lip 46 of catcher 30 are removed by a fluid suction arrangement (not shown).

In like manner, deflection electrode 32 includes a body 48 and a porous plate 50 which together define a suction chamber 52. Ink mist which may accumulate on plate 50 is ingested into chamber 52 and carried away by the fluid suction arrangement. The potential sources 34 and 36 provide a potential difference between plates 42 and 50 and therefore a deflection field therebetween. The print head 10 preferably produces a plurality of jet drop streams arranged in a row normal to the plane of FIG. 1 and skewed with respect to the direction of movement of medium 22. As a consequence, the drops in trajectories 38 are deflected in a direction which is inclined with respect to the direction of movement of the medium and which results in the deposit of drops from each jet at positions which are laterally displaced across the medium and longitidunally displaced along the medium.

A separate charge electrode driver, including a switched amplifier circuit 54 and an AND gate 56, applies print control signals to each of the charge electrodes 26 via line 58, as more fully discussed below. The print control signals are provided upon receipt of a print enable pulse on line 60 and, in dependence upon the print control signals, drops are selectively deposited on medium 22. The driver, however, provides a signal to electrode 26 upon failure to receive a print enable signal such that drops produced during this time, termed "guard drops", are directed to the catcher 30.

The present invention provides print enable signal pulses to the charge electrode driver and, further, provides a drop clock signal pulse train to drive the electromechanical transducer at the frequency for which it was designed. The print enable signal pulses are provided in synchronism with the drop clock signal pulse train so that the charging signals provided by the charge electrode driver to the charge electrode are properly timed with respect to the break up of successively formed drops. A print enable pulse is, however, provided only after an increment of movement of the print receiving medium 22, such that the drops deposited by the print head 10 on the medium are properly spaced in the direction of movement of the medium.

Finally, the electromechanical transducer is driven at a sufficiently high frequency such that at least two unneeded drops may be discarded as guard drops between successive print enable pulses. By providing for the stimulation of drops at a frequency slightly greater than three times the nominal print enable pulse frequency, occasionally three guard drops, rather than two, will be provided between successive print drops, with the result that the circuit of the present invention can compensate for fluctuations in the velocity of the print receiving medium.

Referring now to FIGS. *2a* and *2b*, it may be seen that the circuit includes an oscillator means, preferably a crystal controlled oscillator 110 and a frequency divider circuit 112, which produces a drop clock signal pulse train on line 114 for application via amplifier 116 to the electromechanical transducer which provides stimulation for breakup of the drops. The oscillator 110 and frequency divider 112 are selected such that the frequency of the drop clock pulse train is substantially equal to the optimum operational frequency of the transducer. As will become apparent, the higher frequency output from oscillator 110 is used as a system clock for the various circuit components.

An edge detector means, including circuit 118, is responsive to the drop clock signal pulse train on line 122 and provides an edge detection pulse on line 120 upon the occurrence of the leading edge of each drop clock signal pulse. A means for providing a synchronization signal on line 124 in dependence upon the speed at which a print receiving medium is transported past the print station includes tachometer 126 and amplifier 128. The synchronization signal consists of a train of synchronization pulses on line 124, each such pulse signifying an increment of movement of the print receiving medium. The balance of the circuitry defines a state controller means 130 which is responsive to edge detection pulses on line 120 and to the synchronization signal on line 124 to provide print enable pulses on line 60. A print enable pulse is produced upon receipt of an edge detection pulse on line 120 next following receipt of a synchronization pulse on line 124.

As indicated previously, the oscillator means includes an oscillator 110 which provides a substantially constant frequency pulse output on line 134 to the counter or frequency divider 112. Counters 136 and 138 are connected in tandem so as to provide a pulse train at a reduced frequency to J-K flip-flop 140 which, in turn, provides the drop clock signal pulse train to lines 114, 122, and 142. Upon the occurrence of each pulse on line 142, counters 136 and 138 are caused to reload their preset counts.

Edge detector means 118 includes a pair of D-type flip-flops 144 and 146, with one output from each of the flip-flops coupled to AND gate 148. Flip-flops 144 and 146 are clocked by pulses on line 150, which pulses occur at a substantially higher rate than the rate at which drop clock signal pulses are supplied to flip-flop 144 via line 122. When a pulse is supplied to flip-flop 144 on line 122, flip-flop 144 is therefore clocked very quickly such that its Q output goes high. Since, at this point, the /Q output of flip-flop 146 is high, the AND gate 148 provides a high output on line 120, indicating detection of a leading edge of a pulse in the drop clock signal pulse train. When the next pulse on line 150 occurs, however, flip-flop 146 is set, such that its /Q output goes low, thus causing the output from gate 148 also to go low. The duration of a pulse on line 120 is therefore equal to the time period between successive pulses on line 150, regardless of the pulse width of the drop clock signal pulses on line 122.

The state controller 130 provides a print enable pulse only after receipt of at least two edge detection pulses on line 120 prior to each synchronization pulse on line 124. By this technique the charge electrode driver is enabled, at the most, only during formation of every third drop and therefore at least two guard drops are produced between successive print drops. In order to accomplish this, the state controller 130 comprises three bistable means, J-K flip-flops 152, 154, and 156, and logic means, including gates 158, 160, and 162, and J-K flip-flop latch 164. The logic means sequentially actuates the flip-flops 152, 154, and 156 in response to the synchronization signal and the edge detection pulses. Flip-flop 154 provides the print enable pulses on line 60 as it repetitively changes states.

The circuit further includes sensor 166 and amplifier 168 which provide a signal on line 170 to the logic means when a print receiving medium, such as a sheet of copy paper, is present at the print station for printing thereon by the ink jet printer. As described below, the presence of a print receiving medium at the print station for receipt of the ink drops is a necessary condition for the production of a print enable pulse by the controller 130. This prevents ink from inadvertently being deposited on the print receiving medium transport or other printer structure. Such an arrangement may not be necessary, however, when printing is being accomplished on a continuous strip or web of paper.

Figure 3:
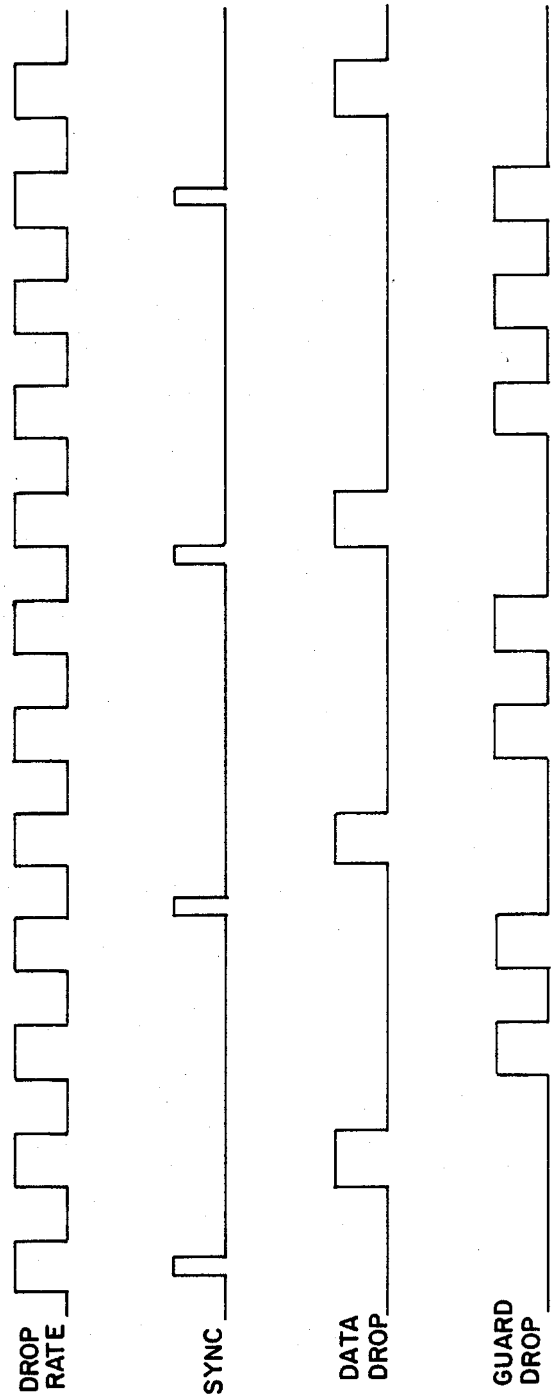
FIG. 3 is a timing diagram useful in explaining the present invention.

FIG. 3 is a timing diagram which is useful, in conjunction with FIGS. *2a* and *2b*, in explaining the manner in which the circuit operates. Flip-flops 152, 154, and 156 are connected such that they are sequentially set by pulses on line 150, assuming that conditions are correct for enablement in sequence of logic gates 158, 160, and 162. Assume that flip-flop 154 has just provided a high signal on its Q output, such that a print enable pulse is in the process of being supplied to line 60. This high output is also supplied to AND gate 162 via line 172 such that upon the occurrence of the next pulse on line 120, indicating detection of a leading edge of a pulse in the drop clock signal pulse train on line 122, the K input of flip-flop 154 goes high. This resets flip-flop 154 and simultaneously sets flip-flop 156, both occurring upon receipt of a clocking pulse on line 150. The Q output of flip-flop 156 therefore goes high, enabling AND gate 158 via line 174 such that, upon the detection of the leading edge of the next successive drop clock signal, flip-flop 156 is reset, while flip-flop 152 is set. Note that sequential actuation of flip-flops 156 and 152 occurs independently of and without regard to whether a synchronizational pulse is received from tachometer 126.

Flip-flops 152, 154, and 156 now remain in this state, i.e., with flip-flop 152 set and flip-flops 154 and 156 reset, until all of the inputs of NAND gate 160 go high. This occurs upon receipt of a pulse on line 120, indicating a leading edge of a drop clock pulse and a high signal on line 175, indicating that during the previous print enable pulse a synchronization pulse was applied to latch 164 via line 124. Note that when flip-flop 156 was set, the negative going pulse from the /Q output, applied to line 176, caused the latch 164 to be reset. As a consequence, only a subsequently received synchronization pulse can result in the high signal on line 175 necessary to enable gate 160. Assuming that a print receiving medium is present at the print station and a high signal is therefore applied to line 170, when the next pulse on line 120 is received by NAND gate 160, its output goes low and, inverted by invertor 178, sets flip-flop 154 and resets flip-flop 152, thus producing the leading edge of a print enable pulse. This pulse lasts until flip-flop 154 is reset by the next pulse on line 120 from leading edge detector circuit 118.

As seen from the timing diagram of FIG. 3, drops are continuously formed at the drop rate (the pulse rate on line 114) while, at the most, the charge electrode driver is enabled and a data drop or print drop is formed from each third drop, with the intermediate drops being guard drops. In some instances, however, due to the fact that the drop rate is slightly greater than three times the synchronization pulse rate, three guard drops will be produced between successive data drops. By this technique, the print drops may be produced in close synchronization with the speed of movement of the print receiving medium, while allowing the electromechanical transducer to be operated continuously at its designed optimum frequency and, further, while providing for at least two guard drops between successive print drops so as to reduce substantially undesired drop-to-drop cross talk. It will be appreciated that if only one guard drop is to be provided between successive print drops, the drop rate may be reduced such that it is slightly greater than two times the synchronization pulse rate. It will be understood, however, that this would also require an attendant modification to the state controller 130.

As seen in FIG. 1, a print enable pulse on line 60 enables AND gate 56, permitting the output stage of shift register 180, storing a binary "1" or "0", to be coupled to control switching amplifier 54. Register 180 has been previously loaded with binary information specifying which of the drops in the associated jet drop stream are to be printed. If a "0" output is coupled to control input 182, the amplifier 54 is switched to its upper switching position. Voltage $V_6$ is amplified and applied to the associated charge electrode 26, thereby causing the drop then being formed to be charged and deflected to catcher 30. If, on the other hand, a "1" output is coupled to input 182, the amplifier 54 is switched to its lower switching position. The voltage ($V_1$, $V_2$, $V_3$, $V_4$, or $V_5$) then being provided by staircase signal generator 184 is delivered to amplifier 54 such that the drop then being produced is charged sufficiently so as to be deflected to the associated one of the five print positions then being serviced.

It will be appreciated that a separate register 180, gate 56 and switching amplifier 54 must be provided to control charging of each jet drop stream. Only one circuit shown in FIGS. *2a* and *2b* and only one staircase signal generator 184 need be provided for the printer, however.

Register 180 and generator 124 both receive synchronization pulses on line 124. Upon receipt of each such pulse, generator 184 cycles to a different voltage level, and register 180 shifts a new bit of binary information to its output stage for application to amplifier 54 via AND gate 56 when an enabling pulse is received subsequently on line 60. As previously discussed, a synchronization pulse is provided just prior to each print enable pulse.

Although disclosed in the context of a multiple jet, multiple print position per jet printer, the present invention has applicability with respect to ink jet printers of all types in which drop placement accuracy is a significant consideration.

While the form of apparatus herein described constitutes a preferred embodiment of the invention, it is to be understood that the invention is not limited to this precise form of apparatus, and that changes may be made therein without departing from the scope of the invention.

What is claimed is:

1. In an ink jet printer having an electromechanical transducer for mechanical stimulation of jet drop stream breakup and at least one charge electrode driver which, when enabled, provides drop charging signals to at least one charge electrode for selectively charging drops in a jet drop stream, said printer including a transport for moving a print receiving medium past a print station, a circuit for providing print enable signal pulses to said charge electrode driver and for providing a drop clock signal pulse train to said electromechanical transducer, comprising:

oscillator means for producing a drop clock signal pulse train for application to said electromechanical transducer, edge detector means, responsive to said drop clock signal pulse train, for providing an edge detection pulse at the leading edge of each pulse in said drop clock signal pulse train, means for providing a synchronization signal in dependence upon the speed at which a print receiving medium is transported past said print station, said synchronization signal consisting of a train of synchronization pulses, each such pulse signifying an increment of movement of said medium, and state controller means, responsive to edge detection pulses and to said synchronization signal, for providing a print enable pulse only upon receipt of the first edge detection pulse next following receipt of each synchronization pulse.

2. The circuit of claim 1 in which said oscillator means comprises an oscillator providing a substantially constant frequency pulse output, and a frequency divider, responsive to said oscillator output, for reducing the frequency of said oscillator output to provide said drop clock signal pulse train.

3. The circuit of claim 1 in which the frequency of said drop clock signal pulse train is greater than three times the average frequency of said synchronization signal, said state controller providing a print enable pulse only after receipt of at least two edge detection pulses prior to each synchronization pulse, whereby at least two guard drops are provided between successive print drops produced by said ink jet printer.

4. The circuit of claim 2 in which said edge detector means is responsive to said substantially constant frequency pulse output such that the duration of each edge detection pulse is equal to the period of said substantially constant frequency pulse output.

5. The circuit of claim 3 in which said state controller comprises three bistable means, and logic means for sequentially actuating said three bistable means in response to said synchronization signal and said edge detection pulses, one of said three bistable means providing said print enable pulses.

6. The circuit of claim 5 in which said logic means includes latch means, responsive to said synchronization signal, for providing a logic output in response to a synchronization pulse.

7. The circuit of claim 6 in which said logic means further comprises gate means, responsive to said latch means and to said edge detector means, for sequentially actuating said three bistable means upon receipt of said synchronization pulses while additionally requiring a logic output from said latch means before actuation of said one of said three bistable means.

8. The circuit of claim 7 further comprising means for sensing the presence of a print receiving medium at said print station, and in which said logic means is responsive to said means for sensing the presence of a print receiving medium at said print station such that a print enable pulse is provided only when said medium is present at said print station.

9. In an ink jet printing system, including a print head having an electromechanical transducer for stimulating drop formation in at least one jet drop stream, a charge electrode associated with said stream for selective charging of drops therein, a drop catcher, deflection means for deflecting drops in dependence upon the electrical charge carried thereby such that the drops are directed either to said catcher or to a print station, transport means for transporting a print receiving medium past said print station for deposit of drops thereon, and a charge electrode driver for applying print control signals to said electrode upon receipt of a print enable signal such that drops are selectively deposited upon said print receiving medium at said print station and for applying a signal to said electrode upon failure to receive a print enable signal such that drops are directed to said catcher, the method of operation comprising the steps of:

generating synchronization pulses in response to movement of said print receiving medium past said print station, generating a drop clock pulse train, applying said drop clock pulse train to said transducer, generating an edge detection pulse at the leading edge of each pulse in said drop clock pulse train, and generating a print enable pulse upon the occurrence of an edge detection pulse next following the occurrence of a synchronization pulse.

10. The method of claim 9 in which the step of generating a print enable pulse includes the step of providing a print enable pulse only after the occurrence of at least two edge detection pulses prior to the synchronization pulse, whereby at least two guard drops are interposed between print drops in said jet drop stream.

11. The method of claim 9 in which said drop clock pulse train is substantially constant in frequency.

12. Method of ink jet printing, comprising the steps of:

(a) generating a stream of printing ink directed toward a print receiving medium, (b) stimulating said stream to break up into drops at a substantially constant drop production frequency, (c) generating a series of gating pulses in phase with the break up of said stream into drops at a frequency which is less than half said drop production frequency, (d) generating an information signal representing a pattern to be printed, (e) gating said information signal under gating control of said gating pulses to produce a printing control signal which changes voltage in synchronism with said gating pulses, (f) using said printing control pulses to direct selected ones of said drops along printing trajectories which avoid a catcher, while directing the rest of said drops along non-printing trajectories which are intercepted by a catcher, (g) transporting a print receiving medium through the region of said printing trajectories, (h) generating a series of synchronizing pulses in synchronism with the movement of said print receiving medium, and (i) adjusting the timing of said gating pulses in correspondence with the timing of said synchronizing pulses, such that each gating pulse is produced in phase with the break up of said stream into a drop immediately after receipt of a synchronizing pulse.

13. The method of claim 12 in which said gating pulses are generated at a frequency which is less than one-third said drop production frequency whereby at least two guard drops are produced after each print drop and prior to the next print drop.

14. The method of claim 12 in which step (f) includes the steps of:

charging each of said selected drops to a selected one of a number of charge levels, and providing a static electrical field through which all drops pass, whereby said selected drops are deflected by varying amounts into said printing and non-printing trajectories.

15. The method of claim 12 in which said drops in said printing trajectories strike said print receiving medium at print positions on said medium arranged in a row which is skewed with respect to the direction of movement of said print receiving medium.

16. A circuit for providing print enable signal pulses to a charge electrode driver and for providing a drop clock signal to an electromechanical transducer, said charge electrode driver and said electromechanical transducer forming part of an ink jet printer in which said transducer mechanically stimulates jet drop stream breakup and in which said charge electrode driver, when enabled, provides drop charging signals to at least one charge electrode for selectively charging drops in a jet drop stream, said circuit comprising:

oscillator means for producing a drop clock signal for application to said electromechanical transducer, detector means, responsive to said drop clock signal, for providing detection pulses in synchronism with said drop clock signal, means for providing a synchronization signal in dependence upon the speed at which a print receiving medium is transported past a print station for printing by said printer, said synchronzation signal consisting of a train of synchronization pulses, each such pulse signifying an increment of movement of said medium, and state controller means, responsive to said detection pulses and to said synchronization signal, for providing a print enable pulse only upon receipt of the first detection pulse next following receipt of each synchronization pulse.

17. The circuit of claim 16 in which said state controller provides a print enable pulse only after receipt of at least two detection pulses prior to each synchronization pulse, whereby the frequency of said print enable signal pulses is no more than one-third of the frequency of said drop clock signal such that at least two guard drops may be provided between successive print drops produced by said ink jet printer.

18. In an ink jet printing system, including a print head having an electromechanical transducer for stimulating drop formation in at least one jet drop stream, a charge electrode associated with said stream for selective charging of drops therein, a drop catcher, deflection means for deflecting drops in dependence upon the electrical charge carried thereby such that the drops are directed either to said catcher or to a print station, transport means for transporting a print receiving medium past said print station for deposit of drops thereon, and a charge electrode driver for applying print control signals to said electrode upon receipt of a print enable signal such that drops are selectively deposited upon said print receiving medium at said print station and for applying a signal to said electrode upon failure to receive a print enable signal such that drops are directed to said catcher, the method of operation comprising the steps of:

generating synchronization pulses only in response to movement of said print receiving medium past said print station, generating the first drop clock signal, applying said drop clock signal to said transducer, generating detection pulses in synchronization with said drop clock signal, and generating a print enable pulse upon the occurrence of a detection pulse next following the occurrence of a synchronization pulse.

19. The method of claim 18 in which the step of generating a print enable pulse includes the step of providing a print enable pulse only after the occurrence of at least two detection pulses prior to the synchronization pulse, wherby at least two guard drops are interposed between print drops in said jet drop stream.

* * * * *

UNITED STATES PATENT AND TRADEMARK OFFICE

CERTIFICATE OF CORRECTION

PATENT NO. : 4,510,503

DATED : April 9, 1985

INVENTOR(S) : Suresh C. Paranjpe and Robert B. McJohnson

It is certified that error appears in the above-identified patent and that said Letters Patent is hereby corrected as shown below:

Column 10, line 52, "pulse upon" should be --pulse only upon--.

Column 10, line 53, "of edge" should be --of the first edge--.

Column 12, line 42, "pulses only in" should be --pulses in--.

Column 12, line 45, "generating the first drop" should be --generating a drop--.

Column 12, line 49, "pulse upon" should be --pulse only upon--.

Column 12, line 50, "of a detection" should be --of the first detection--.

Column 12, line 56, "wherby" should be --whereby--.

Signed and Sealed this

*Twenty-seventh* Day of *August 1985*

[SEAL]

*Attest:*

DONALD J. QUIGG

*Attesting Officer* *Acting Commissioner of Patents and Trademarks*